(12) United States Patent
Ofir et al.

(10) Patent No.: US 10,895,679 B2
(45) Date of Patent: Jan. 19, 2021

(54) LIGHT-GUIDE OPTICAL ELEMENT AND METHOD OF ITS MANUFACTURE

(71) Applicant: LUMUS LTD, Ness Ziona (IL)

(72) Inventors: Yuval Ofir, Ness Ziona (IL); Edgar Friedmann, Ness Ziona (IL); Meir Tzion Bitan, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 15/939,285

(22) Filed: Mar. 29, 2018

(65) Prior Publication Data
US 2018/0292599 A1    Oct. 11, 2018

(30) Foreign Application Priority Data

Apr. 6, 2017  (IL) .......................................... 251645

(51) Int. Cl.
*F21V 8/00* (2006.01)
*G02B 27/10* (2006.01)
(Continued)

(52) U.S. Cl.
CPC ......... *G02B 6/0076* (2013.01); *G02B 6/0055* (2013.01); *G02B 6/0058* (2013.01);
(Continued)

(58) Field of Classification Search
CPC ........................... G02B 27/0172; G02B 6/0076
See application file for complete search history.

(56) References Cited

U.S. PATENT DOCUMENTS

| 2,748,659 A | 6/1956 | Geffcken et al. |
| 2,795,069 A | 6/1957 | Hardesty |
(Continued)

FOREIGN PATENT DOCUMENTS

| CN | 200941530 Y | 9/2007 |
| CN | 101542346 | 9/2009 |
(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

*Primary Examiner* — Joseph L Williams
*Assistant Examiner* — Jacob R Stern
(74) *Attorney, Agent, or Firm* — Mark M. Friedman

(57) ABSTRACT

An optical structure and corresponding process of manufacture for light guide optical elements (LOEs) which guide light by reflection at major surfaces. The structure further includes light directing surfaces for coupling light out of the LOE, obliquely inclined with respect to the major surfaces. The optical structure is formed from a stack of multiple optically transparent layers each of which has a surface pattern of regions configured as light directing surfaces which are arranged in an X-Z plane in a spaced-apart relationship along at least the X-axis with optically transparent regions between them. The layers are stacked along a Y-axis so that each of the surface patterns is located at an interface between two adjacent layers and the patterns of the layers are aligned with a shift of a predetermined value along one or both of the X-axis and Z-axis.

27 Claims, 10 Drawing Sheets

(51) Int. Cl.
  *G02B 27/00*   (2006.01)
  *G02B 27/14*   (2006.01)
  *G02B 27/01*   (2006.01)

(52) U.S. Cl.
  CPC ....... *G02B 6/0065* (2013.01); *G02B 27/0081* (2013.01); *G02B 27/1073* (2013.01); *G02B 27/145* (2013.01); *G02B 6/0036* (2013.01); *G02B 27/0172* (2013.01)

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt |
| 4,084,883 A | 4/1978 | Eastman et al. |
| 4,191,446 A | 3/1980 | Arditty et al. |
| 4,309,070 A | 1/1982 | St. Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Machler |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,239,092 B1 | 5/2001 | Papasso et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,542,307 B2 | 4/2003 | Gleckman et al. |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,339,742 B2 | 3/2008 | Amitai et al. |
| 7,355,795 B1 | 4/2008 | Yamazaki et al. |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Skendzic et al. |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,884,985 B2 | 2/2011 | Amitai et al. |
| 7,949,214 B2 | 5/2011 | Dejong |
| 7,995,275 B2 | 8/2011 | Maeda et al. |
| 8,000,020 B2 | 8/2011 | Amitai |
| 8,004,765 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,369,019 B2 | 2/2013 | Baker |
| 8,405,573 B2 | 3/2013 | Lapidot et al. |
| 8,432,614 B2 | 4/2013 | Amitai |
| 8,643,948 B2 | 2/2014 | Amitai et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,810,914 B2 | 8/2014 | Amitai et al. |
| 8,861,081 B2 | 10/2014 | Amitai et al. |
| 8,902,503 B2 | 12/2014 | Amitai et al. |
| 8,913,865 B1 | 12/2014 | Bennett |
| 8,965,152 B2 | 2/2015 | Simmonds |
| 9,025,253 B2 | 5/2015 | Hadad et al. |
| 9,069,180 B2 | 6/2015 | Amitai et al. |
| 9,104,036 B2 | 8/2015 | Amitai et al. |
| 9,207,457 B2 | 12/2015 | Amitai |
| 9,248,616 B2 | 2/2016 | Amitai |
| 9,279,986 B2 | 3/2016 | Amitai |
| 9,316,832 B2 | 4/2016 | Amitai et al. |
| 9,417,453 B2 | 8/2016 | Amitai et al. |
| 9,448,408 B2 | 9/2016 | Amitai et al. |
| 9,500,869 B2 | 11/2016 | Amitai |
| 9,551,880 B2 | 1/2017 | Amitai |
| 9,568,738 B2 | 2/2017 | Mansharof et al. |
| 9,709,809 B2 | 7/2017 | Miyawaki et al. |
| 9,740,013 B2 | 8/2017 | Amitai et al. |
| 9,804,396 B2 | 10/2017 | Amitai |
| 9,805,633 B2 | 10/2017 | Zheng |
| 9,910,283 B2 | 3/2018 | Amitai |
| 9,933,684 B2 | 4/2018 | Brown et al. |
| 10,048,499 B2 | 8/2018 | Amitai |
| 10,222,535 B2 | 3/2019 | Remhof et al. |
| 10,261,321 B2 | 4/2019 | Amitai |

(56) References Cited

U.S. PATENT DOCUMENTS

| | | | |
|---|---|---|---|
| 10,302,835 B2 | 5/2019 | Danziger |
| 10,302,957 B2 | 5/2019 | Sissom |
| 2001/0030860 A1 | 10/2001 | Kimura et al. |
| 2002/0015233 A1 | 2/2002 | Park |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0130681 A1 | 7/2004 | Aastuen et al. |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0024849 A1 | 2/2005 | Parker et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai et al. |
| 2005/0265044 A1 | 12/2005 | Chen et al. |
| 2006/0126182 A1 | 6/2006 | Levola |
| 2006/0268421 A1 | 11/2006 | Shimizu et al. |
| 2007/0070859 A1 | 3/2007 | Hirayama |
| 2007/0188837 A1 | 8/2007 | Shimizu et al. |
| 2008/0025667 A1 | 1/2008 | Amitai |
| 2008/0094586 A1 | 4/2008 | Hirayama |
| 2008/0106775 A1 | 5/2008 | Amitai et al. |
| 2008/0151375 A1 | 6/2008 | Lin |
| 2008/0151379 A1 | 6/2008 | Amitai |
| 2008/0186604 A1 | 8/2008 | Amitai |
| 2008/0192239 A1 | 8/2008 | Otosaka |
| 2008/0198471 A1 | 8/2008 | Amitai |
| 2008/0247150 A1 | 10/2008 | Itoh et al. |
| 2008/0278812 A1 | 11/2008 | Amitai |
| 2008/0285140 A1 | 11/2008 | Amitai |
| 2009/0010023 A1 | 1/2009 | Kanade et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2010/0077110 A1 | 3/2010 | Amitai et al. |
| 2010/0111472 A1 | 5/2010 | DeJong |
| 2010/0171680 A1 | 7/2010 | Lapidot et al. |
| 2010/0202128 A1 | 8/2010 | Saccomanno |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2011/0096566 A1 | 4/2011 | Tsai et al. |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0147361 A1 | 6/2012 | Mochizuki et al. |
| 2012/0179369 A1 | 7/2012 | Lapidot et al. |
| 2012/0194781 A1 | 8/2012 | Agurok |
| 2012/0306940 A1 | 12/2012 | Machida |
| 2013/0022316 A1 | 1/2013 | Pelletier et al. |
| 2013/0135749 A1 | 5/2013 | Akutsu et al. |
| 2013/0229717 A1 | 9/2013 | Amitai |
| 2013/0276960 A1 | 10/2013 | Amitai |
| 2013/0279017 A1 | 10/2013 | Amitai |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0182748 A1* | 7/2015 | Gefen ............... G02B 27/0172 607/54 |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0241619 A1 | 8/2015 | Richards et al. |
| 2015/0277127 A1 | 10/2015 | Amitai |
| 2015/0293360 A1 | 10/2015 | Amitai |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0234485 A1 | 8/2016 | Robbins et al. |
| 2016/0238844 A1 | 8/2016 | Dobschal |
| 2016/0341964 A1 | 11/2016 | Amitai |
| 2016/0349518 A1 | 12/2016 | Amitai et al. |
| 2016/0370693 A1 | 12/2016 | Watanabe |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0097506 A1* | 4/2017 | Schowengerdt ...... G02B 26/103 |
| 2017/0139116 A1* | 5/2017 | Zeng ................... G02B 6/0076 |
| 2017/0242249 A1 | 8/2017 | Wall |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0293856 A1 | 9/2019 | Danziger |
| 2019/0339530 A1 | 11/2019 | Amitai |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |

FOREIGN PATENT DOCUMENTS

| | | |
|---|---|---|
| CN | 101846799 A | 9/2010 |
| CN | 106104569 | 11/2016 |
| CN | 107238928 | 10/2017 |
| DE | 1422172 | 11/1970 |
| DE | 19725262 | 12/1998 |
| DE | 102013106392 | 12/2014 |
| EP | 0365406 | 4/1990 |

(56) References Cited

FOREIGN PATENT DOCUMENTS

| | | |
|---|---|---|
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 0770818 | 4/2007 |
| EP | 1779159 | 5/2007 |
| EP | 2530510 | 12/2012 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2276222 | 11/1994 |
| GB | 2278888 | 12/1994 |
| JP | H1994242260 | 3/1996 |
| JP | 2001021448 | 1/2001 |
| JP | 2002539498 | 11/2002 |
| JP | 2003140081 | 5/2003 |
| JP | 2003149643 | 5/2003 |
| JP | 2003536102 | 12/2003 |
| JP | 2004527801 | 9/2004 |
| JP | 2005084522 | 3/2005 |
| JP | 2006003872 | 1/2006 |
| JP | 2006145644 | 6/2006 |
| JP | 2009515225 | 4/2009 |
| JP | 2010060770 | 3/2010 |
| JP | 2010170606 | 8/2010 |
| JP | 2011221235 | 11/2011 |
| JP | 2012163659 | 8/2012 |
| JP | 2013076847 | 4/2013 |
| TW | 201809798 | 3/2018 |
| WO | 9510106 | 4/1995 |
| WO | 9815868 | 4/1998 |
| WO | 1998/058291 | 12/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 0195027 | 12/2001 |
| WO | 02082168 | 10/2002 |
| WO | 03058320 | 7/2003 |
| WO | 03081320 | 10/2003 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006085308 | 8/2006 |
| WO | 2006085309 | 8/2006 |
| WO | 2006085310 | 8/2006 |
| WO | 2006087709 | 8/2006 |
| WO | 2006098097 | 9/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009009268 | 1/2009 |
| WO | 2009074638 | 6/2009 |
| WO | 2011130720 | 10/2011 |
| WO | 2013065656 | 5/2013 |
| WO | 2013175465 | 11/2013 |
| WO | 2013188464 | 12/2013 |
| WO | 2015081313 | 6/2015 |
| WO | 2015158828 | 10/2015 |
| WO | 2016103251 | 6/2016 |
| WO | 2016132347 | 8/2016 |
| WO | 2017106873 | 6/2017 |
| WO | 2017199232 | 11/2017 |

* cited by examiner (GENERAL ART)

LIGHT-GUIDE OPTICAL ELEMENT AND METHOD OF ITS MANUFACTURE

TECHNOLOGICAL FIELD AND BACKGROUND

The present invention is in the field of optical devices and relates to a compact light-guide optical element and a method of its manufacture. More specifically, the present invention relates to a substrate-guided optical device including one or more at least partially reflecting or diffractive surfaces carried by a common light-transmissive substrate.

Such light-guide optical element (LOE) can be used in a large number of imaging applications, such as portable DVDs, cellular phone, mobile TV receiver, video games, portable media players, or any other mobile display devices, e.g. see-through near-eye display, or head-mounted display, for use in augmented/virtual reality systems. The main physical principle of the operation of LOE is that light waves are trapped inside a substrate by total internal reflections from the major surfaces of the LOE. In addition, the light waves which are trapped inside the LOE are coupled out into the eyes of the viewer by one or more internal reflecting or partially reflecting/diffractive surfaces.

One of the important factors defining the performance of the above-described LOE is associated with a requirement for uniformity of illumination formed by light output from the LOE. To this end, the actual active area of each partially reflecting surface is to be considered, because a potential non-uniformity in the resulting image might occur due to the different reflection sequences of different rays that reach each selectively reflecting surfaces. More specifically, some rays arrive without previous interaction with a selectively reflecting surface; while other rays arrive after one or more partial reflections.

Since the inactive portions of the selectively reflecting surfaces do not contribute to the coupling of the trapped light waves out of the substrate, their impact on the optical performance of the LOE can be only negative. That is, if there is no overlapping between the reflecting surfaces then there will be inactive optical portions in the output aperture of the system and "holes" will exist in the image. On the other hand, the inactive portions of the reflecting surfaces are certainly active with respect to the light waves from the external scene. In addition, the major axis orientation of two adjacent surfaces cannot be identical; otherwise the entire second surface will be inactive. Therefore, if overlapping is set between the reflective surfaces to compensate for the inactive portions in the output aperture then rays from the output scene that cross these overlapped areas will suffer from double attenuations and holes will be created in the external scene. This phenomenon significantly reduces the performance not only of displays, which are located at a distance from the eye like head-up displays, but that of near-eye displays also.

The above problem, and some solutions therefor, are described for example in U.S. Pat. No. 7,724,443 and WO 2007/054928, both assigned to the assignee of the present application. The possible technique to overcome the problem is by providing that only the actual active portions of the partially reflecting surfaces are embedded inside the substrate, that is, the reflecting surfaces do not intersect with the lower major surface, but terminate short of this surface. Since the ends of the reflecting surfaces are adjacent to one another over the length of the LOE, there is no holes in the projected augmented image, and since there is no overlap between the surfaces there is no holes in the real image of the external view, thus providing uniform illumination.

GENERAL DESCRIPTION

There is need in the art for a novel approach for the fabrication of light guide elements (LOEs) of the kind described above, namely LOEs configured for trapping light inside a substrate by total internal reflections from the major surfaces of the LOE, and carrying one or more reflecting or partially reflecting/diffractive surfaces for coupling the trapped light out of the substrate.

Such LOE and light propagation scheme therein and out thereof is generally illustrated in FIG. 1A. The LOE 20 has a light input region 21 (e.g. being aligned with an output of a virtual image source), major surfaces 26 and 28 guiding light by total internal reflections therefrom, and one or more at least partially reflective/diffractive surfaces 22 arranged with proper orientation inside the LOE. After several reflections from the major surfaces 26, 28, the trapped light waves reach the selective partially reflecting surface(s) 22, coupling the light out of the LOE to propagate in output direction(s) towards a pupil 25 of viewer's eye 24.

Generally speaking such at least partially reflective/diffractive surface 22 embedded in the LOE's substrate serves for redirecting the light propagating in a general propagation direction through the substrate in one or more output directions. For simplicity, such surface is termed herein below as "light directing surface".

As known, for example from the above-indicated U.S. Pat. No. 7,724,443 and WO 2007/054928 assigned to the assignee of the present application, the high performance (e.g. uniform illumination) of the LOE can be provided by embedding such light directing surfaces 22 in the substrate such that they are spaced from the major surface(s) 26, 28.

As schematically shown in FIG. 1B, according to some of the techniques described in these patent publications, such configuration can be achieved by attaching a blank plate 132 (i.e. a plate with no partially reflecting surfaces) to one of the major surfaces of the light guide substrate 130 (e.g. by using optical cement), so as to yield at an LOE 134 with the appropriate active apertures for all of the reflecting surfaces. As noted above, the two major surfaces, 26 and 28, are parallel to each other in such a way that the combined structure forms a complete rectangular parallelepiped.

As shown schematically in FIG. 1C, according to alternative techniques known from these patent publications, the same can be achieved by fabricating two similar, tooth-shaped transparent forms 140 fabricated by injection-molding or casting. The required reflecting surfaces 22 (either anisotropic or coated thin-film) are inserted in the appropriate places between the forms 140 and the two forms are then glued together to create the required LOE 144.

As seen in the figures, the resulting structure 134 (FIG. 1B) has interface 50 located in a plane parallel to the major surfaces and thus inclined with respect to the reflecting surfaces 22; and the resulting structure 144 (FIG. 1C) has an interface 150 having regions/segments 150A located in planes substantially parallel to the reflecting surfaces 22 and regions/segments 150B located in planes intersecting those of the reflecting surfaces and the major surfaces.

Generally, in order to achieve an undistorted image having good optical quality, the major and the (partially) reflecting/diffractive surfaces should have high quality. On the other hand, it is desired that the fabrication process of such LOE is as simple and straightforward as possible, as well as cost effective.

The present invention provides a novel approach for the fabrication of an LOE with one or more at least partially reflecting/diffractive surfaces (at times referred to herein below as "light directing surfaces") coupling light out of the LOE's substrate/body, and a resulting novel configuration of the LOE.

Thus, according to one broad aspect of the invention, it provides a light guide optical element (LOE) comprising: an optically transparent body which has major surfaces for guiding input light in a general propagation direction through the body by total internal reflections of light from said major surfaces, and carries at least one light directing surface, each light directing surface being configured for coupling the input light out of the body towards one or more output directions. The configuration is such that each of said at least one light directing surface is fully embedded in a volume of said body such that it is spaced from the major surfaces; and the body comprises one or more interfaces inside the body, where all of said one or more interfaces inside the body are located in at least one plane parallel to each of said at least one light directing surface and inclined with respect to said major surfaces at a predetermined angle, said at least one light directing surface being located in at least one region, respectively, at one of said one or more interfaces.

It should be understood, that in the LOE of the invention there are no interfaces other than those parallel to the light directing surfaces and extending between the major surfaces, and all the light directing surfaces are arranged in regions of at least some of such interfaces. In this connection, it should be understood that the term "interface" used herein refers to a physical boundary between elements forming an integral structure of the LOE.

In some embodiments, the body (substrate) of the LOE comprises an inner pattern formed by an array of two or more of the light directing surfaces arranged in a spaced-apart parallel relationship along at least one axis. The light directing surfaces of the array are located at the one or more interfaces inside the body and are fully embedded in the volume thereof such that the two or more light directing surfaces are spaced from the major surfaces.

At least some of such multiple light directing surfaces may be substantially equally spaced from the at least one of the major surfaces; as well as at least some of the multiple light directing surfaces may be of different or same dimensions, while differently spaced from the major surfaces.

It also should be noted that, although the invention is described below as using light directing surfaces being at least partially reflective/diffractive with respect to the input light propagating in the body, the principles of the invention are not limited to these specific applications. Thus, generally, the light directing surfaces have optical properties different from their surroundings, and may generally include surfaces having different optical properties differently affecting the input light propagating though the body (e.g. inducing polarization effect, spectral effect, etc.).

In some embodiments, the multiple light directing surfaces of the LOE are arranged in a spaced-apart relationship along two perpendicular axes in said at least one plane.

The present invention provides a novel method for fabricating the above-described LOE. Moreover, the method of the invention is advantageous for mass production of such LOEs, as is provides a simple technique for concurrently manufacturing multiple LOEs using any known suitable patterning technique(s).

Thus, according to another broad aspect of the invention, it provides a method for fabrication of two or more light guide optical elements (LOEs) configured as described above, the method comprising:

preparing at least one patterned substrate, the patterned substrate having an optically transparent planar body with a surface thereof formed with a pattern of spaced apart, parallel, light directing regions, which are arranged in an X-Z plane in a spaced-apart relationship along one of X-axis and Z-axis with optically transparent spacer regions between them;

enclosing said at least one patterned substrate between top and bottom optically transparent substrates, thereby forming a stack of multiple optically transparent layers stacked one on top of the other along Y-axis, where the pattern of the spaced apart, parallel, light directing regions is located at an interface between the layers;

dicing said stack of multiple optically transparent layers along a dicing plane intersecting with the X-Z plane and forming a predetermined angle with the X-Z plane, into a predetermined number of slices spaced from one another along the X-axis, to thereby define a plurality of bodies for the LOEs, each of said bodies comprising the at least one light directing region which is fully embedded in the LOE's body such that said at least one light directing region is spaced from major surfaces of the LOE and forms with said major surfaces said predetermined angle.

The method further comprises applying edge cutting to each of said slices producing the LOE having the optically transparent body having major surface and comprising the at least one light directing surface embedded in the body spaced from the major surfaces.

In some embodiments, where each of the LOEs to be fabricated should include multiple light directing regions, more than one patterned substrates are provided being placed one on top of the other along the Y-axis and being all enclosed between the top and bottom layers, such that the patterns of said patterned substrates are located at interfaces between the adjacent layers and are shifted with respect to one another along one of X-axis and Z-axis, thereby forming said plurality of the LOEs, each LOE comprising an inner pattern comprising two or more spaced-apart light directing regions fully embedded in the body.

It should be noted that, in some embodiments, the shift value is smaller than a minimal spacer/uncoated region between the adjacent light directing regions in the layer.

The above shift of the patterns in the adjacent layers can be achieved by properly applying the patterning process; or by shifting the similarly patterned substrates with respect to one another along X-axis.

The dimensions of the spacer regions and the dicing of the stack into the slices define distance(s) of the light directing region(s) from the major surfaces of the LOE. The two or more light directing regions may include regions of different dimensions, as well as may include regions having different optical properties differently affecting the input light.

The patterned layers may be of the same or different thicknesses.

As indicated above, the patterned substrate may be prepared by any known suitable technique, e.g. a lithography process (negative or positive patterning) creating the pattern of the spaced apart, parallel, light directing regions spaced by optically transparent spacer regions; or applying to a surface of the optically transparent planar body a direct writing patterning process.

It should be understood that, in some cases, an intermediate structure formed by the above-described stack of multiple optically transparent layers where one or more of the layers have the surface pattern, can be produced, and supplied to a customer for further slicing into LOE bodies, when needed.

The invention, in its yet further broad aspect provides such an optical structure prepared for forming therefrom multiple LOE's bodies. The optical structure is configured as a stack of multiple optically transparent layers, wherein:

each of said optically transparent layers has a surface pattern of parallel light directing regions which are arranged in an X-Z plane in a spaced-apart relationship along at least X-axis with optically transparent space regions between them;

the multiple layers are stacked one on top of the other along Y-axis such that each of the surface patterns is located at an interface between two adjacent layers and the patterns of said layers are aligned with a shift of a predetermined value along one of the X-axis and Z-axis, thereby enabling dicing of the optical structure, along a dicing plane intersecting with a X-Z plane and forming a predetermined angle with the X-Z plane, into a predetermined number of slices spaced along one of the X-axis and Z-axes, to produce a plurality of bodies for the LOE elements, each of said bodies being formed with an inner pattern comprising an array of spaced-apart, parallel, light directing regions fully embedded in the LOE's body and being inclined with respect to surfaces of the LOE body, configured for major reflecting surfaces, with said predetermined angle.

As indicated above, the multiple layers may include two or more layers of different thicknesses.

The light directing regions of the pattern may be arranged in spaced-apart relationship along both the X-axis and Z-axis.

The invention also provides a light guide optical element (LOE) comprising an optically transparent body comprising major surfaces and configured for guiding input light in a general propagation direction through the body by total internal reflections of light from said major surfaces, and carrying at least one light directing surface configured for coupling said input light out of the body towards one or more output directions and being fully embedded in a volume of said body such that it is spaced from the major surfaces, the LOE being manufactured by a method comprising:

preparing at least one patterned substrate having an optically transparent planar body with a surface thereof formed with a pattern of spaced apart, parallel, light directing regions, which are arranged in an X-Z plane in a spaced-apart relationship along one of X-axis and Z-axis with optically transparent regions of the substrate between them;

enclosing said at least one patterned substrate between top and bottom optically transparent substrates, thereby forming a stack of multiple optically transparent layers stacked one on top of the other along Y-axis, where the pattern of the spaced apart, parallel, light directing regions is located at an interface between the layers;

dicing said stack of multiple optically transparent layers along a dicing plane intersecting with an X-Z plane and forming a predetermined angle with said X-Z plane, into a predetermined number of slices spaced from one another along said one of the X-axis and Z-axis, to thereby define a plurality of bodies for the LOEs, each of said bodies comprising the at least one light directing region which is fully embedded in the LOE's body

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1A:
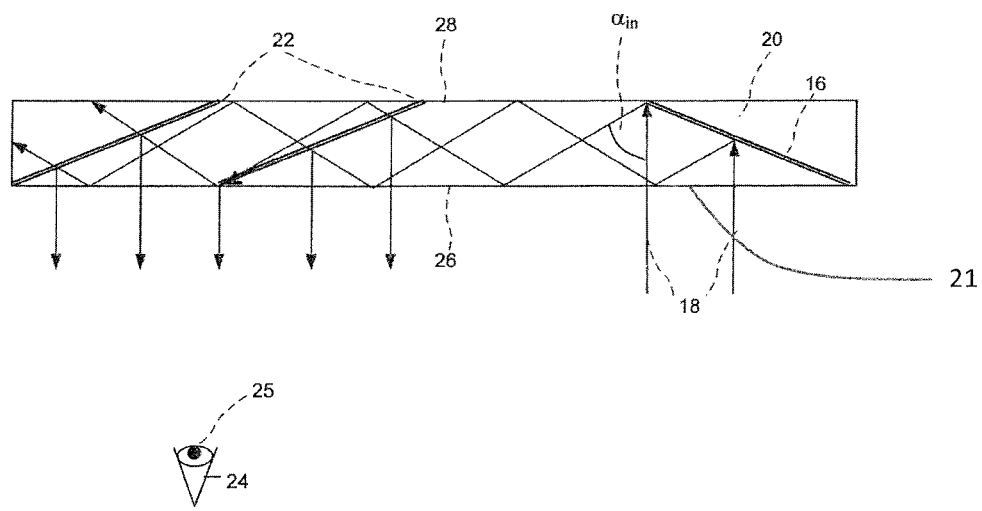
FIG. 1A schematically illustrate the configuration and operation of a convention planar light-guide optical element (LOE) of the type to which the present invention relates.
Figure 1B:
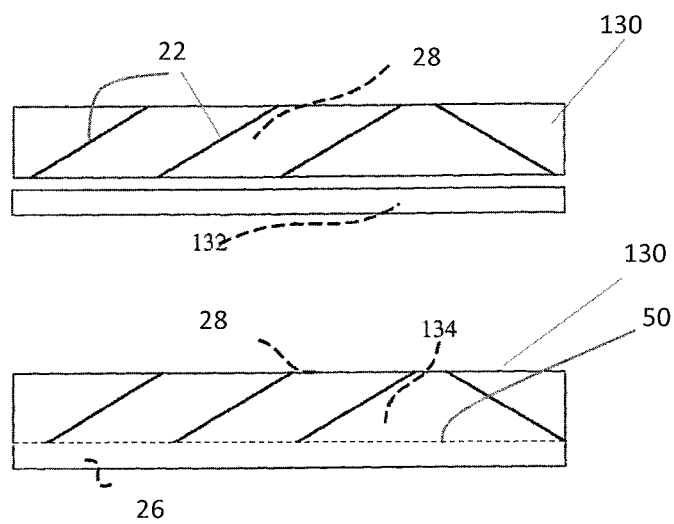
FIGS. 1B and 1C show two known examples of the LOW configuration aimed at solving the problem associated with the conventional LOW configuration of FIG. 1A.
Figure 1C:
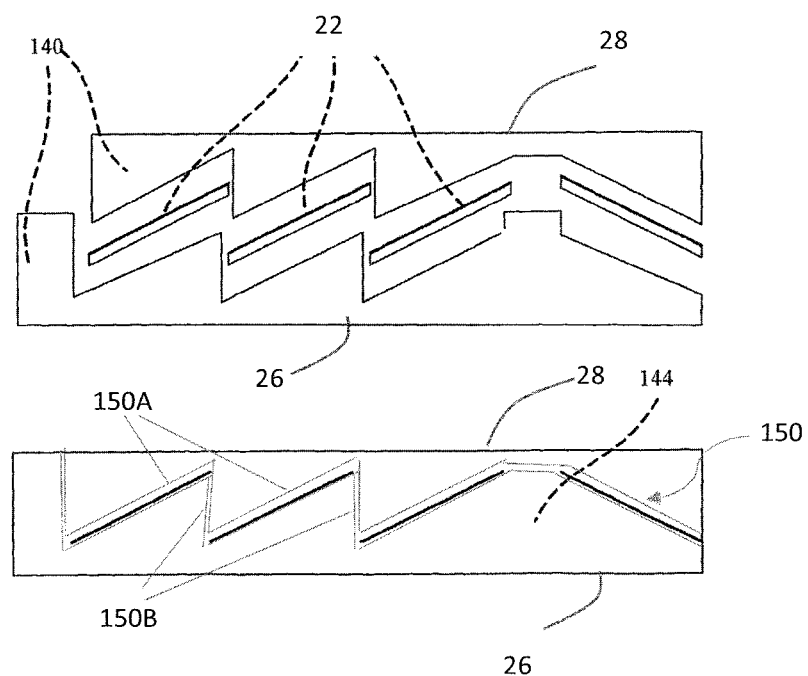

As described above, FIG. 1A illustrates schematically the configuration and operation (light propagation scheme) in a conventional LOE device, and FIGS. 1B and 1C show two examples of the improved LOE configuration providing that the light directing surfaces are fully embedded in substrate of the LOE device, being spaced from the major surface(s) thereof.

Figure 2:
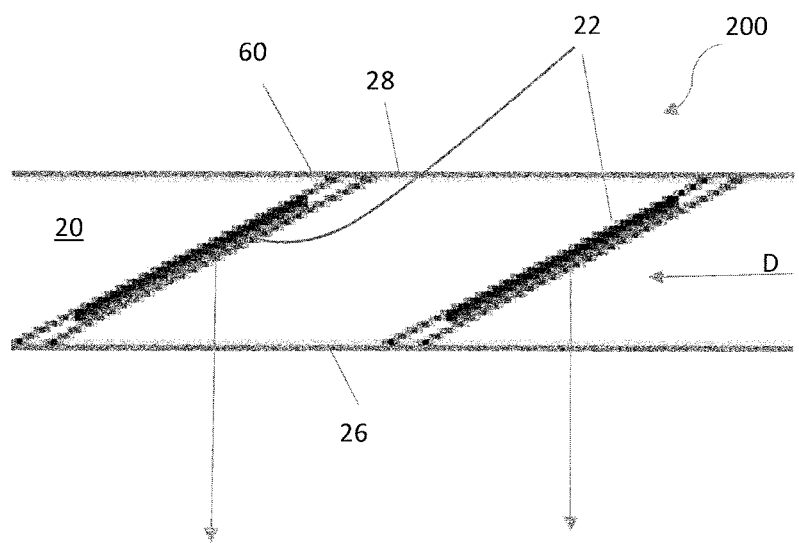
FIG. 2 shows schematically the configuration of the LOE according to the present invention.

Reference is now made to FIG. 2 which schematically illustrates a part of an LOE device 200 configured according to the present invention. To facilitate understanding, the same reference numbers are used for identifying components that are common in all the examples of the invention and those of the known device described above.

The LOE 200 includes an optically transparent body 20 which has two major surfaces 26 and 28 and one or more light directing surface 22. The LOE's is thus configured for guiding input light in a general propagation direction D through the body by total internal reflections of light from the major surfaces 26 and 28, and interaction of the so-propagating light with the light directing surface(s) 22 couples the light out of the body towards one or more output directions. The LOE 200 is preferably configured such that all of the light directing surface(s) 22 are fully embedded in the volume of the body 20 being spaced (equally or not) from the major surfaces. The LOE 200 is manufactured such that the body 20 includes one or more internal interfaces, generally at 60, where each internal interface extends between the major surfaces, and where all the interfaces (in the simplest case there may be only one such interface) are located in planes parallel to that/those of the light directing surface(s) 22, and the light directing surface(s) 22 is/are located in region(s), respectively, such one or more interfaces 60.

The following are several examples of a fabrication method of the invention for fabricating the LOE device of the invention. The simplest example of concurrent manufacture of multiple bodies for LOEs, where each LOEs includes a single light directing region, is shown in FIGS. 3A-3D; and more practical examples for concurrent manufacture of multiple LOE's bodies where each LOE includes an array of two or more light directing surfaces 22 arranged in an X-Z plane in a spaced-apart parallel relationship along one of the X-axis and Z-axis (the light directing regions may be elongated extending along the Z-axis) are described below with reference to FIGS. 4A-4E, 5A-5G and 6A-6F.

Figure 3A:
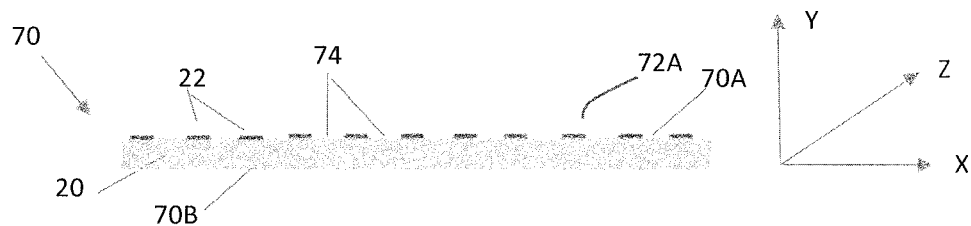
FIGS. 3A-3D show an example of a method of the invention for fabrication of the multiple LOEs, each configured with a single light directing region embedded in the LOE's body.
Figure 3B:
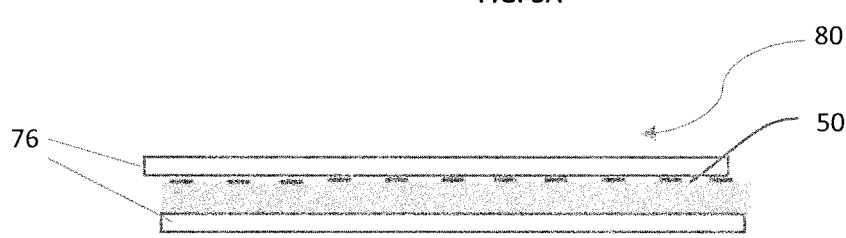
Figure 3C:
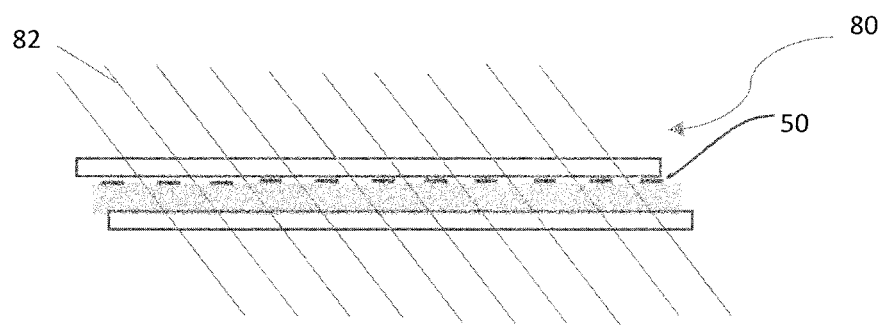
Figure 3D:
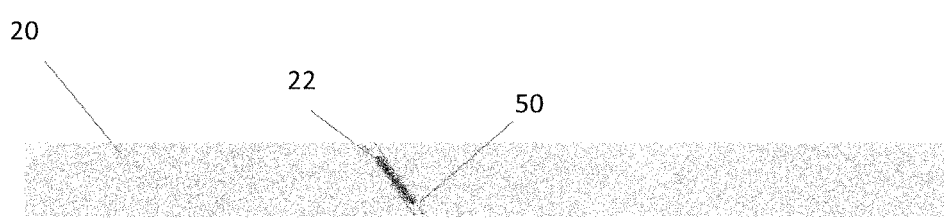

As shown in FIG. 3A, a patterned substrate 70 is prepared. The patterned substrate 70 has an optically transparent planar body 20 with at least one surface pattern 72A on at least one of its surfaces 70A. It should be understood, although not specifically shown, that the opposite surface 70B may also be provided with a surface pattern. The pattern 72A is in the form of an array of spaced apart, parallel, light directing regions 22 (generally at least two such regions) spaced by optically transparent regions 74 of the substrate 20. Typically, the regions 22 and 74 are, respectively, coated by desired light directing material (e.g. at least partially reflective or diffractive) and transparent regions (i.e., not configured to cause redirecting of light) which are typically uncoated. The transparent regions are referred to herein according to a preferred embodiment as "uncoated", but it should be understood that this does not preclude implementations in which various coatings or layers are present at the transparent regions which, after bonding with suitable index-matched optical cement or other optical bonding techniques, maintain the required transparency of the transparent regions. The light directing regions 22 in this example are elongated extending along the Z-axis, and are arranged in a spaced-apart relationship along the X-axis with optically transparent uncoated regions 74 between them. The surface pattern 72A may be created using any known suitable techniques, such as lithography (negative or positive), direct writing, etc., following or preceding with an optical coating process.

It should be noted, and will described more specifically further below that the light directing regions 22 may be arranged in a two-dimensional array, i.e. light directing regions may be spaced apart along both the X- and Z-axes.

Then, the patterned substrate 70 is enclosed between optically transparent layers 76 (or at least the patterned surface 70A is covered by such layer 76). Thus, a multi-layer stack 80 is created, by gluing with an optical adhesive, including optically transparent layers (substrates) 20, 76 stacked one on top of the other along the Y-axis, where the pattern 72A of the light directing regions 22 is located at an interface 50 between the layers. As noted above, the configuration may be such that another surface pattern is made on surface 70B and is thus located at an interface between surface 70B and the other optically transparent layer 76.

Then, a dicing/cutting is applied to the stack 80 (FIG. 3C) along dicing planes 82 which intersect with the X-Z plane at predetermined angle and pass through the optically transparent uncoated regions 74. By this a plurality of LOE's bodies 20 are fabricated—11 such bodies in the present example, only one of which being shown in FIG. 3D. Each such LOE has one light directing region 22 fully embedded in the LOE's body 20 and forming said angle with the major surfaces. As shown, such LOE has no internal interfaces other than interface 50 which is located in a plane parallel to the light directing surface 22 and said light directing surface is located on a region of the interface 50 while being spaced from the outer surfaces of the body 22.

These outer major surfaces may than be further processed by the application of a various coatings including, but not limited to, Hard Coating (HC), Anti-scratch coating, super-hydrophobic coating, anti-smudge coating, anti-bacterial and anti-fouling coating, Anti-reflection coating, to create the major reflective surfaces of the LOE. Methods for the creating these coatings may include but are not limited to, liquid/solvent based coating such as dip coating, spin coating, spray-coating, die coating, capillary coating, roll coating, curtain/knife coating, bar-coating, or various printing technique, and may further include a curing step (e.g. UV/Electron beam/Thermal curing) and an additional polishing step. Alternatively, dry coatings like evaporation or sputtering of optical coatings might be applied. It should also be noted, although not specifically shown here, that an edge cutting process can be applied to each body resulting from the dicing process, thereby producing the LOE of the desired configuration to guiding input light in a general propagation direction by total internal reflections from the major surfaces and coupling light out of the LOE by interaction with the light directing surface.

As mentioned above, the method of the invention can advantageously be used for concurrent manufacture of a large number of LOEs, each including an array of light directing surfaces. One of such method is exemplified in FIGS. 4A-4E. In this example, the method starts from preparation of the patterned substrates 70 (FIG. 4A) generally similar to the substrate of FIG. 3A. The substrates are prepared using any known suitable patterning technique.

The patterned substrates 70 are optically bonded along the Y-axis with an optical adhesive in an aligned manner one on top of the other (FIG. 4B), and may be enclosed between top and bottom optically transparent layers or only uppermost patterned surface may be covered by an optically transparent layer. By this, a multi-layer stack 80 is fabricated. In such stack 80, the patterns 72 are located at interfaces between the adjacent layers. Also, in such stack, the patterns 72 located in different planes are shifted with respect to one another along the X-axis with a predetermined shift value $\Delta x$. The shift value $\Delta x$ is smaller than the minimal X-dimension, $X_{uncoat}$, of the uncoated optically transparent region 74 between the adjacent light directing regions 22 in the layer. Such shifted-patterns' configuration can be obtained by either preparing the patterned layers with the required shift of the patterns, or by stacking the similarly patterned layers with the required lateral shift.

Figure 4A:
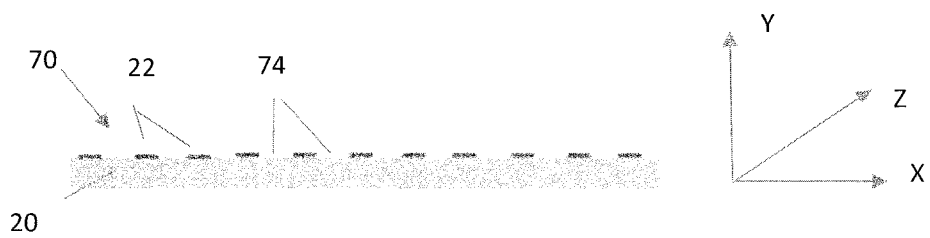
FIGS. 4A-4E show another example of a method of the invention for fabrication of the multiple LOEs, each configured with a plurality of the spaced-apart light directing regions embedded in the LOE's body, by stacking multiple patterned substrates where the regions in each substrate extend along the Z-axis and are spaced along the X-axis, and the patterns in the stacked substrates are shifted along the X-axis.
Figure 4B:
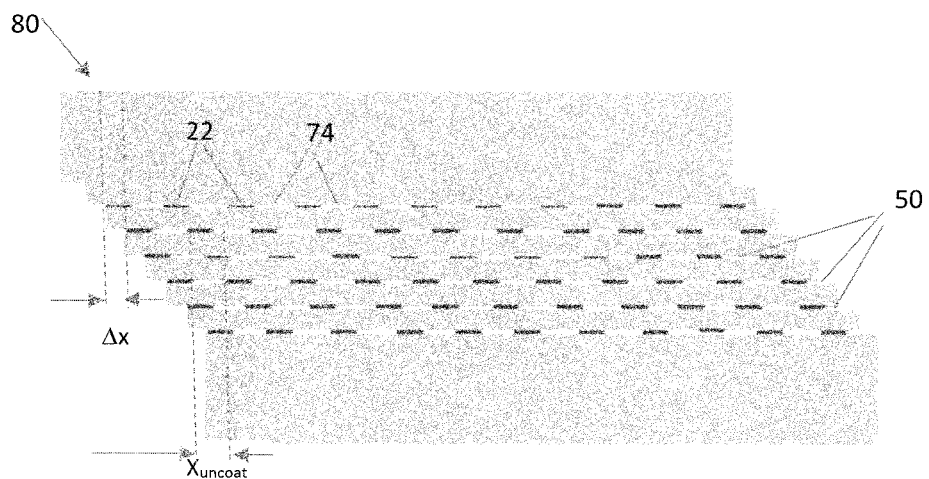
Figure 4C:
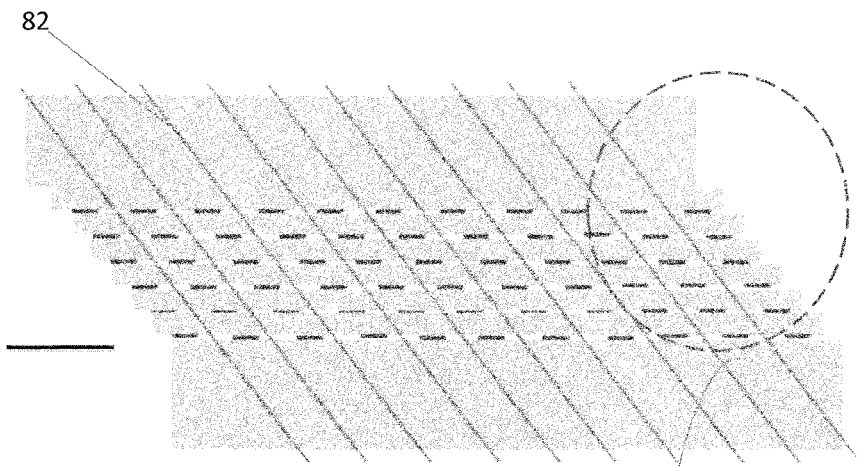
Figure 4D:
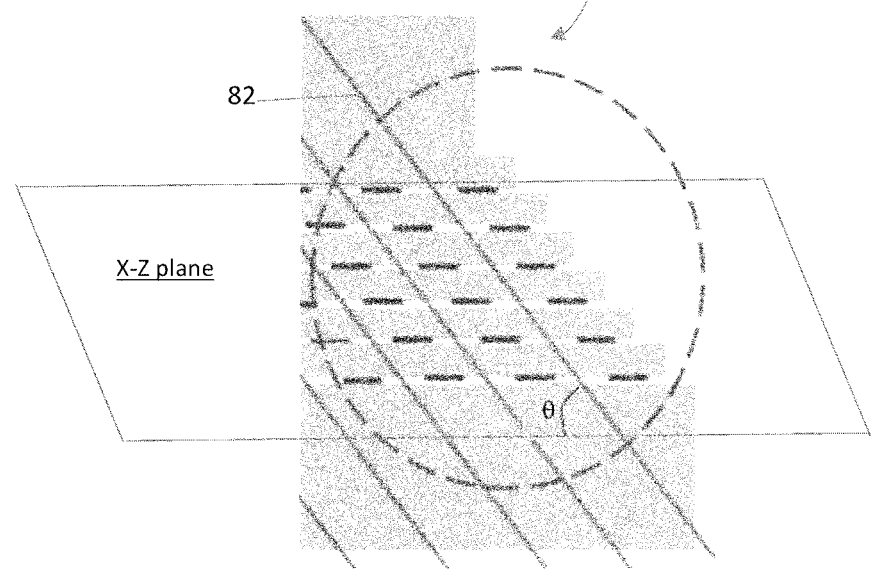
Figure 4E:
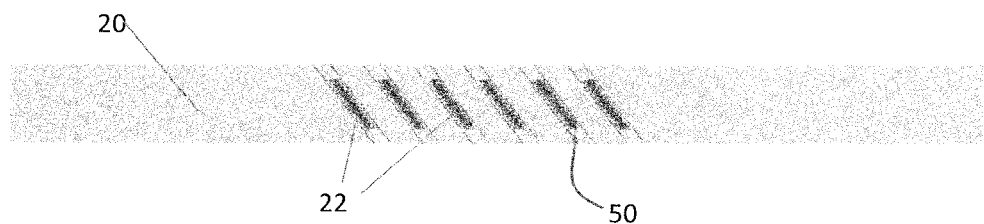

Then, the above-described dicing/cutting process is applied to the multi-layer stack 80 (FIGS. 4C and 4D) along dicing planes 82 which intersect with the X-Z plane forming a predetermined angle $\theta$ with the X-Z plane (as shown in FIG. 4D) and pass through the spacer regions 74 in all the patterned layers. This process results in the multiple LOE's bodies, each configured as shown in FIG. 4E, being formed with the multiple light directing regions 22 all fully embedded in the body 20 such that they are spaced from the major surfaces and are oriented with the angle θ with respect to the major surfaces. Also, the edge cutting process can be applied, either to the entire stack 80, or separately to each LOE body resulting from the dicing process.

Figure 4F:
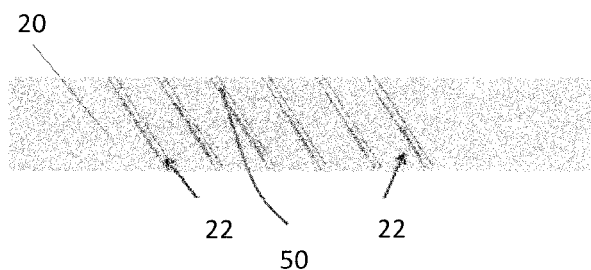
FIG. 4F exemplifies the LOE fabricated by the general method of FIGS. 4A-D, but using different patterned layers, such that multiple light directing surfaces in the LOE include light directing surfaces having different dimensions and being differently spaced from at least one of the major surfaces.

It should be understood that the dimensions of the spacer/uncoated regions 74 between the light directing regions 22, as well as the parameters of the dicing applied to the stack, define distance(s) of the light directing regions 22 from the major surfaces of the LOE. As exemplified in FIG. 4F, the configuration may be such that the light directing regions 22 in the LOE 20 include regions of the same or different dimensions, as well as regions that are equally or differently spaced from the major surfaces.

FIGS. 5A to 5G show another example of a method of the invention for fabrication of the multiple LOEs, each having an array of light directing regions. First, multiple patterned substrates are prepared, one such patterned substrate 70 being shown in FIG. 5A. The patterned substrate has an optically transparent planar body 20 with a surface pattern 72A on at least one surfaces 70A. As mentioned above, the opposite surface of the substrate may also be provided with a surface pattern. The pattern 72A is in the form of two or more spaced apart, parallel, light directing regions 22 (regions coated with the required light redirecting material, such as reflective, partially reflective, or diffractive material) spaced by optically transparent (uncoated) regions 74 along the X-axis. In this example, the light directing 22 regions are elongated (lines) extend along the Z-axis. The surface pattern 72A may be created using any known suitable techniques, such as lithography (negative or positive), direct writing, etc., following or preceding with an optical coating process.

Figure 5A:
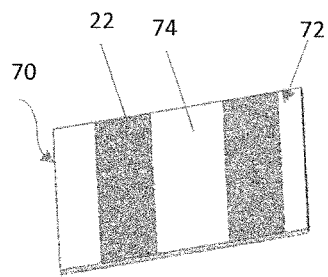
FIGS. 5A to 5G show yet another example of a method of the invention for fabrication of the multiple LOEs, each configured with a plurality of the spaced-apart light directing regions embedded in the LOE's body, by stacking multiple patterned substrates where the regions in each substrate extend along the Z-axis and are spaced along the X-axis, and the patterns in the stacked substrates are shifted along the Z-axis.
Figure 5B:
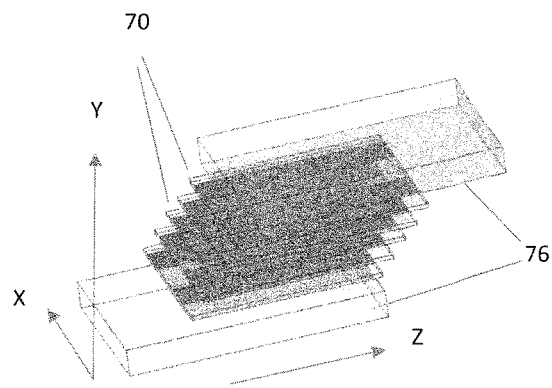

Multiple patterned substrates 70 are prepared to be enclosed between top and bottom optically transparent layers/plates 76 (FIG. 5B). The patterned substrates 70 are then stacked using an optical adhesive in an aligned manner one on top of the other along the Y-axis (FIG. 5C), and enclosed between the top and bottom optically transparent unpatterned plates 76 (or only the uppermost patterned surface may be covered by an optically transparent plate 76). By this, a multi-layer stack 80 is fabricated. In such stack 80, the patterns 72 (light directing regions) are located at the interfaces 50 between the adjacent layers. Also, in such stack 80, the substrates are shifted with respect to one another along the Z-axis with a predetermined shift value Δz.

Figure 5D:
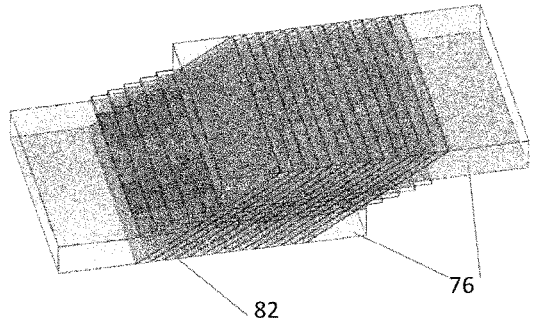

A dicing/cutting process being applied to the multi-layer stack 80 is shown in FIG. 5D. As shown, the dicing planes 82 intersect with the X-Z plane forming a predetermined angle with the X-Z plane (as described above with reference to FIG. 4D). This process results in multiple LOE substrates—one such substrate 20 being shown in FIG. 5E. This substrate has two arrays 78A and 78B of light directing regions embedded therein (generally, two or more arrays, depending on the pattern in each initial substrate 70), where the light directing regions in the array are arranged in a spaced-apart relationship along the Z-axis, and the two arrays are arranged with a space 84 between them along the X-axis. A further dicing/cutting stage may optionally be applied to the space region 84 in such multi-array substrate (FIG. 5F), in order to obtain two LOE bodies 20A and 20B, containing respectively arrays 78A and 78B of the embedded light directing regions. In implementations of the present invention in which dicing is performed on two non-parallel planes, at least one of the dicing planes preferably passes through the transparent regions so as not to intersect the light directing regions so that the light directing regions are spaced inwards from the outer surface in the corresponding dimension of the LOE. In the present example, dicing planes 82 do intersect embedded light directing regions 78A and 78B, but the dicing plane of FIG. 5F does not. In this case, the light directing regions are not "fully embedded", as described in the following embodiments, but are inwardly spaced from the external surfaces of the LOE in at least one dimension. As shown in FIG. 5G, each of the so-obtained LOE's substrates/bodies further undergoes edge cutting and polishing. The light directing regions 22 are located within interfaces 50 oriented at the angle θ with respect to major surface 26 and 28, and regions 22 are appropriately spaced from the major surfaces.

Figure 5C:
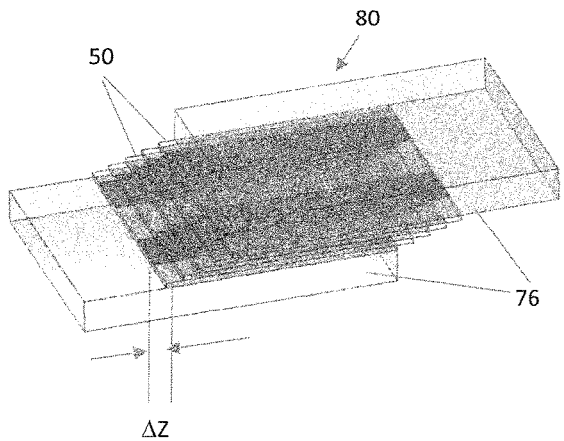
Figure 5E:
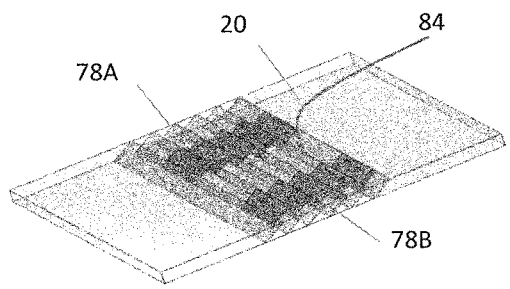
Figure 5F:
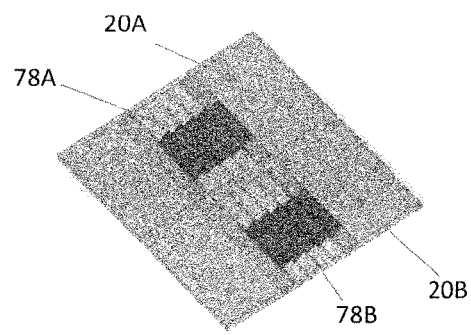
Figure 5G:
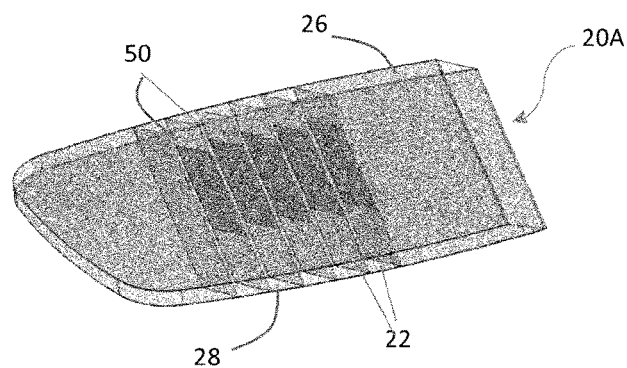

It should be understood that the cutting process of FIG. 5F can alternatively be applied to the entire stack 80 of FIG. 5C, prior to the dicing process exemplified in FIG. 5D (i.e. dicing along planes 82). In this case, the dicing of FIG. 5D would be applied twice, separately to the each of two so-obtained single-array stacks.

Reference is now made to FIGS. 6A to 6F showing yet further example of a method of the invention for concurrent fabrication of the multiple LOEs, each with multiple light directing regions. This example is actually an alternative to that of FIGS. 5A-5G.

Figure 6A:
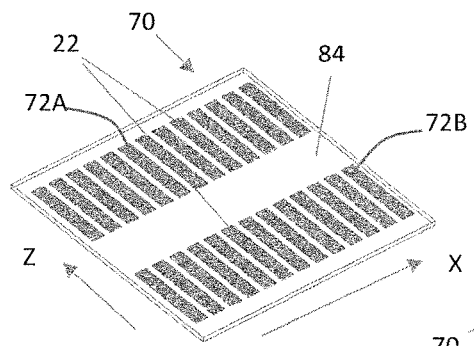
FIGS. 6A to 6F show yet further example of a method of the invention for fabrication of the multiple LOEs, each configured with a plurality of the spaced-apart light directing regions embedded in the LOE's body, by stacking multiple patterned substrates where the regions in each substrate extend along the Z-axis and are spaced along both the X-axis and the Z-axis, and the patterns in the stacked layers are shifted along the X-axis.

FIG. 6A shows one of a multiple patterned substrates 70. However, in this example, a patterned surface (generally, at least one surface) of the substrate 70 has a pattern in the form of a two-dimensional array of light directing regions arranged in a spaced-apart relationship along both the X-axis and the Z-axis. As described above, the light directing regions are coated by desired light directing material and are spaced by uncoated regions of the substrate. Thus, the pattern may be described as being formed by two arrays 72A and 72B of regions 22, where the arrays are spaced along the Z-axis, and the regions 22 of each array are spaced-apart along the X-axis.

Figure 6B:
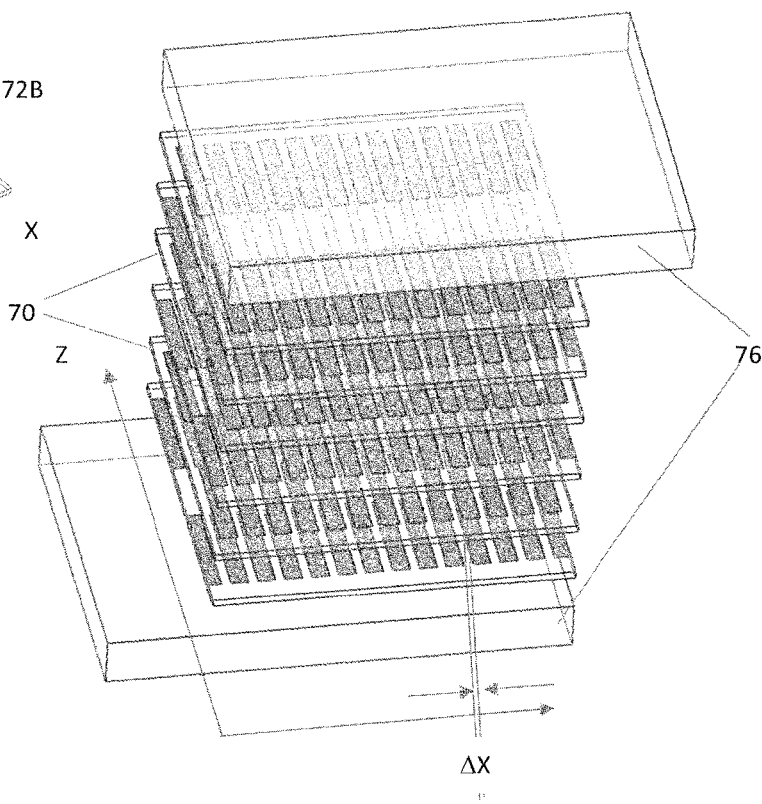
Figure 6C:
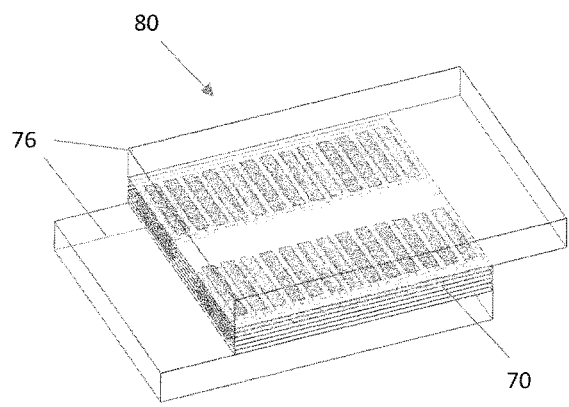
Figure 6D:
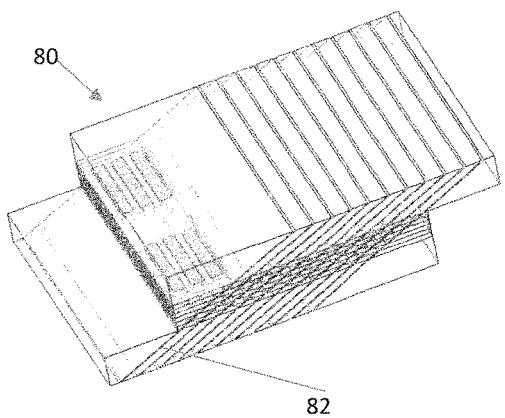

Multiple patterned substrates 70 are prepared and put one on top of the other such that the patterns of different substrates are shifted with respect to one another along the X-axis a predetermined shift value Δx, as shown in FIG. 6B. The shift value Δx is smaller than the minimal X-dimension, $X_{uncoat}$, of the uncoated optically transparent region 74 between the adjacent light directing regions 22 in the layer. It should be understood that in order to obtain such shift between the patterns, either the initially prepared substrates have shifted patterns, or the similarly patterned substrates are stacked with such shift, or both techniques are used.

The patterned substrates are optically bonded with an optical adhesive in an aligned manner one on top of the other to form a stack 80 (FIG. 6C), and may be enclosed between top and bottom optically transparent layers 76 (or only covered by the uppermost layer). In such stack 80, the patterns (light directing regions 22) are located at interfaces 50 between the adjacent layers/substrates.

Figure 6E:
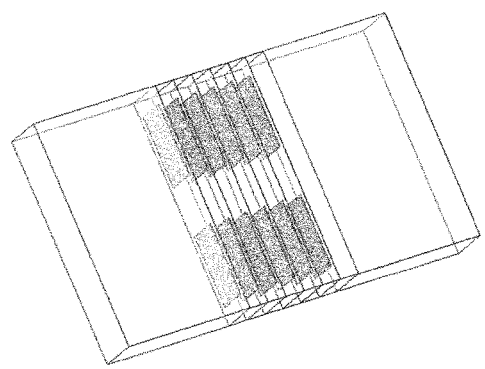
Figure 6F:
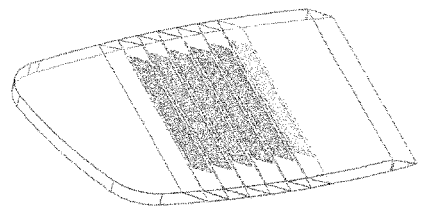

A dicing/cutting process, similar to that described above with respect to FIGS. 3C and 4C, is applied to the multi-layer stack 80 (FIG. 6D) along dicing planes 82 which intersect with the X-Z plane forming a predetermined angle θ therewith as described above. The resulting LOE body 20, being one of the multiple bodies, is shown in FIG. 6E, and after the edge cutting and polishing process—is shown in FIG. 6F. As described above, in this example, the dicing/cutting along the X-axis in the space between the two arrays, might be first applied to the stack 80 and then the dicing along planes 82 may be applied to each of the resulting half-stacks. Each LOE body 20 has multiple spaced-apart parallel light directing regions all fully embedded in the body such that they are spaced (equally or not) from the surfaces 26 and 28 that are to serve as major surfaces.

It should be understood that the LOE produced by the methods of the invention (FIGS. 3D, 4E, 5G and 6F) has no internal interfaces other than interfaces 50 which are located in a plane parallel to the light directing surface 22 and said light directing surfaces are located in regions of the interfaces 50, while being spaced from the external surfaces of the body 22 in at least one dimension, and in particularly preferred cases, being spaced from the surfaces to be used as the major reflective surfaces of body 22.

Figure 7:
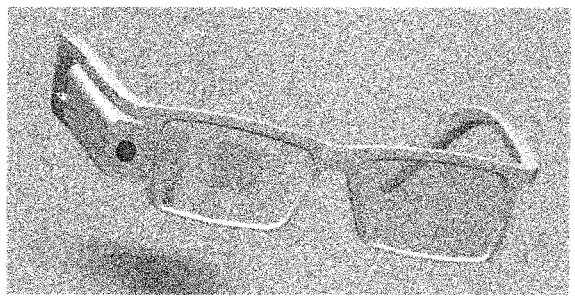
FIG. 7 illustrates a spectacles configured in which the lenses incorporate the LOEs of the invention.

FIG. 7 exemplifies how the structure (LOE) of the invention can be incorporated in spectacles. Each lens in the spectacles is formed as or carries the LOE attached thereto, and, when used together with a virtual image source, the light directing surfaces directs virtual image light towards the wearer's eye.

The invention claimed is:

1. An optical structure that is an intermediate work-product configured to be subdivided along a plurality of parallel dicing planes to produce two or more light guide optical elements (LOEs) configured such that each LOE comprises an optically transparent body for guiding input light in a general propagation direction through the body by total internal reflections of light from major surfaces of the body and comprises light directing surfaces for coupling the input light out of the body in one or more output directions, where the light directing surfaces are fully embedded in a volume of the body being spaced from the major surfaces of the body and are inclined with respect to said major surfaces at a predetermined angle, the optical structure being configured as a stack of multiple optically transparent layers, wherein:

each of said optically transparent layers has a planar surface arranged in an X-Z plane and provided with a surface pattern of a plurality of elongated light directing regions having parallel extensional directions, said light directing regions being in a spaced-apart relationship along at least an X-axis with optically transparent space regions between them; and the multiple layers are stacked one on top of the other along a Y-axis such that each of the surface patterns is located at an interface between two adjacent layers and the patterns of said layers are shifted relative to adjacent layers by a predetermined shift value along one of the X-axis and the Z-axis;

wherein said surface pattern of light directing regions and said optically transparent space regions are deployed such that dicing of the optical structure, along a plurality of parallel dicing planes intersecting with an X-Z plane and forming a predetermined angle with the X-Z plane, subdivides the optical structure into a plurality of slices spaced along said one of the X-axis and Z-axis, to produce a plurality of bodies for the LOE elements, each of said bodies having an internal array of spaced-apart, parallel, light directing regions fully embedded in the LOE's body and inclined with respect to major surfaces of the LOE body at said predetermined angle.

2. The optical structure according to claim 1, wherein the multiple layers are stacked one on top of the other along Y-axis with the shift along said one of the X-axis and Z-axis, thereby providing that the patterns of said layers are aligned with said shift.

3. The optical structure according to claim 1, wherein the multiple layers comprise at least two layers of different thicknesses.

4. The optical structure according to claim 1, wherein said light directing regions of the pattern are arranged in spaced-apart relationship along the X-axis and Z-axis.

5. The optical structure according to claim 1, wherein said light directing surfaces comprise surfaces having different optical properties differently affecting the input light.

6. The optical structure according to claim 1, wherein the light directing regions comprise regions directing light by at least one of reflection and diffraction effects.

7. The optical structure according to claim 1, wherein the patterns of said layers are aligned with the shift along the X-axis, said shift being of a value smaller than a minimal space between said light directing regions along the X-axis.

8. The optical structure according to claim 1, wherein the light directing surfaces comprise surfaces which are substantially equally spaced from the major surfaces at said dicing planes.

9. The optical structure according to claim 1 wherein the light directing surfaces comprise surfaces of different dimensions such that they are differently spaced from the major surfaces at said dicing planes.

10. A method for fabricating two or more light guide optical elements (LOEs), such that each of said two or more LOEs comprises an optically transparent body for guiding input light in a general propagation direction through the body by total internal reflections of light from major surfaces of the body and comprises at least one light directing surface for coupling the input light out of the body in one or more output directions, where said at least one light directing surface is fully embedded in a volume of body being spaced from the major surfaces of the body and inclined with respect to said major surfaces at a predetermined angle, the method comprising:

providing the optical structure of claim 1; and dicing said Gtack optical structure along a plurality of dicing planes intersecting with the X-Z plane and forming a predetermined angle with said X-Z plane, so as to subdivide the optical structure into a plurality of slices spaced from one another along said one of the X-axis and Z-axis, to thereby define a plurality of bodies for the LOEs, each of said bodies having an internal array of spaced-apart, parallel, light directing regions fully embedded in the LOE's body and inclined with respect to major surfaces of the LOE body at said predetermined angle.

11. The method according to claim 10, further comprising applying edge cutting to each of said slices producing the LOE having the optically transparent body for guiding input light in a general propagation direction by total internal reflections from its major surfaces and comprising the at least one light directing surface for affecting the input light propagation towards one or more output directions, which is spaced from the major surfaces.

12. The method according to claim 10, comprising more than one patterned substrates placed one on top of the other along the Y-axis and being all enclosed between said top and bottom layers, such that the patterns of said patterned substrates are located at interfaces between the adjacent layers and are shifted with respect to one another along one of X-axis and Z-axis, thereby forming said plurality of the LOEs, each LOE comprising an inner pattern comprising two or more spaced-apart light directing regions fully embedded in the body.

13. The method according to claim 10, comprising more than one patterned substrates placed one on top of the other along the Y-axis, being all enclosed between said top and bottom layers, wherein the patterned substrates are shifted with respect to one another along X-axis, thereby providing that the patterns of said patterned substrates are shifted with respect to one another along X-axis with a shift value being smaller than a minimal spacer region between the adjacent light directing regions in the layer, thereby forming said plurality of the LOEs, each LOE comprising an inner pattern comprising two or more spaced-apart light directing regions fully embedded in the body.

14. The method according to claim 10, wherein dimensions of the spacer regions and the dicing of said stack into the slices defines distance of the light directing region from the major surfaces of the LOE.

15. The method according to claim 12, wherein the two or more light directing regions comprise regions of different dimensions such that they are differently spaced from the major surfaces.

16. The method according to claim 12, wherein said two or more light directing regions comprise regions having different optical properties differently affecting the input light.

17. The method according to claim 10, wherein the light directing regions comprise regions directing light by at least one of reflection and diffraction effects.

18. The method according to claim 10, wherein said preparing of the at least one patterned substrate comprises applying to a surface of the optically transparent planar body a lithography process to create said pattern of the spaced apart, parallel, light directing regions spaced by optically transparent spacer regions.

19. The method according to claim 18, wherein said lithography process is configured to apply a negative or positive patterning to create said pattern.

20. The method according to claim 10, wherein said preparing of the at least one patterned substrate comprises applying to a surface of the optically transparent planar body a direct writing patterning process to create said pattern of the spaced apart, parallel, light directing regions spaced by optically transparent spacer regions.

21. The method according to claim 10, wherein each of the major surfaces comprising an outer coating including at least one of the following: Hard Coating (HC), Anti-scratch coating, super-hydrophobic coating, anti-smudge coating, anti-bacterial and anti-fouling coating, Anti-reflection coating.

22. The method according to claim 21, comprising applying one of the following processes to said outer surfaces to create said major surfaces of the LOE: liquid/solvent based coating; one or more printing techniques; one or more dry coatings.

23. The method according to claim 22, wherein said liquid/solvent based coating comprises at least one of the following: dip coating, spin coating, spray-coating, die coating, capillary coating, roll coating, curtain/knife coating, bar-coating.

24. The method according to claim 22, wherein said one or more dry coatings comprise at least one of the following: evaporation; and sputtering of optical coatings.

25. The method according to claim 22, further comprising applying a curing processes to the liquid/solvent based coatings or printed coatings on said outer surfaces.

26. The method according to claim 25, further comprising applying polishing to the outer surfaces.

27. A light guide optical element (LOE) comprising an optically transparent body comprising major surfaces and configured for guiding input light in a general propagation direction through the body by total internal reflections of light from said major surfaces, and carrying at least one light directing surface configured for coupling said input light out of the body towards one or more output directions and being fully embedded in a volume of said body such that it is spaced from the major surfaces, the LOE being manufactured by a method comprising:
   providing the optical structure of claim 1; and
   dicing said optical structure along a plurality of dicing planes intersecting with the X-Z plane and forming a predetermined angle with said X-Z plane, so as to subdivide the optical structure into a plurality of slices spaced from one another along said one of the X-axis and Z-axis, to thereby define a plurality of bodies for the LOEs, each of said bodies having an internal array of spaced-apart, parallel, light directing regions fully embedded in the LOE's body and inclined with respect to major surfaces of the LOE body at said predetermined angle.

* * * * *